US008575792B2

(12) United States Patent
Brooker et al.

(10) Patent No.: US 8,575,792 B2
(45) Date of Patent: Nov. 5, 2013

(54) MOTORIZED STAGE

(75) Inventors: Jeffrey S. Brooker, Oak Hill, VA (US); Paulo Chaves, Manassas, NJ (US); Keith Dhese, Cambridge (GB); Robin Eddington, Cambridge (GB)

(73) Assignee: Thorlabs, Inc., Newton, NJ (US)

( * ) Notice: Subject to any disclaimer, the term of this patent is extended or adjusted under 35 U.S.C. 154(b) by 51 days.

(21) Appl. No.: 12/906,091

(22) Filed: Oct. 16, 2010

(65) Prior Publication Data

US 2011/0089771 A1  Apr. 21, 2011

Related U.S. Application Data

(60) Provisional application No. 61/252,263, filed on Oct. 16, 2009.

(51) Int. Cl.
  *H02K 41/02*   (2006.01)
(52) U.S. Cl.
  USPC ............... 310/12.05; 310/12.04; 310/12.06; 310/12.15
(58) Field of Classification Search
  USPC .......... 310/12.05, 12.15, 12.01, 12.04, 12.06, 310/12.31
  See application file for complete search history.

(56) References Cited

U.S. PATENT DOCUMENTS

| 4,243,899 A | 1/1981 | Jaffe |
| 4,445,798 A | 5/1984 | Munehiro |
| 4,667,139 A * | 5/1987 | Hirai et al. ............... 318/687 |
| 5,149,967 A | 9/1992 | Otaka |
| 5,760,500 A | 6/1998 | Kondo et al. |
| 5,763,965 A | 6/1998 | Bader |
| 5,909,066 A * | 6/1999 | Nanba et al. ............... 310/12.14 |
| 6,313,551 B1 | 11/2001 | Hazelton |
| 2004/0207271 A1* | 10/2004 | Korenaga et al. ............... 310/12 |
| 2005/0280316 A1* | 12/2005 | Nozawa et al. ................. 310/12 |
| 2006/0082225 A1 | 4/2006 | Korenaga et al. |
| 2007/0205672 A1 | 9/2007 | Nozawa et al. |
| 2008/0043325 A1 | 2/2008 | Ue et al. |
| 2009/0183926 A1* | 7/2009 | De Leo ...................... 177/25.17 |
| 2009/0218894 A1* | 9/2009 | Aso et al. ................... 310/12.31 |

FOREIGN PATENT DOCUMENTS

| EP | 1447902 | 8/2004 |
| JP | 6027387 | 2/1994 |
| JP | 06027387 A * | 2/1994 |

OTHER PUBLICATIONS

Machine Trnaslation JP06027387 (1994).*
International Search Report with Written Opinion for corresponding International Application No. PCT/2010/052983, mailed Feb. 15, 2011.

* cited by examiner

*Primary Examiner* — Tran Nguyen
*Assistant Examiner* — Jose Gonzalez Quinones
(74) *Attorney, Agent, or Firm* — Graham Curtin, PA

(57) ABSTRACT

A stage comprising a first translation platform having a first axis of motion, and a second translation platform having a second axis of motion, a first linear drive motor for driving the first translation platform in the first axis of motion, and a second linear drive motor for driving the second translation platform in the second axis of motion, wherein each linear drive motor further comprises a coil assembly enclosing a rod stator, and wherein the coil assembly is fixed and the rod stator is movable within the coil assembly.

18 Claims, 5 Drawing Sheets

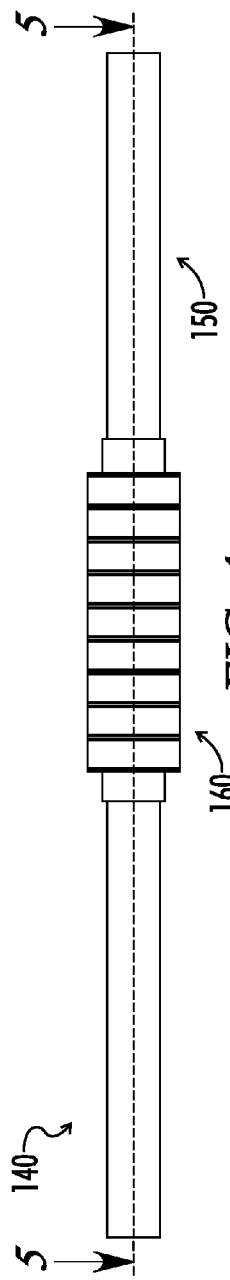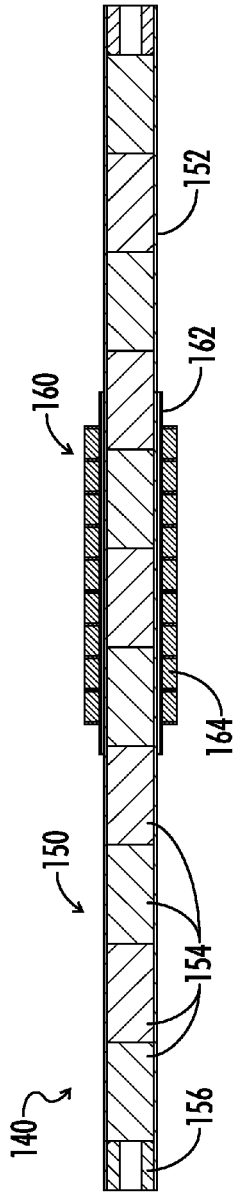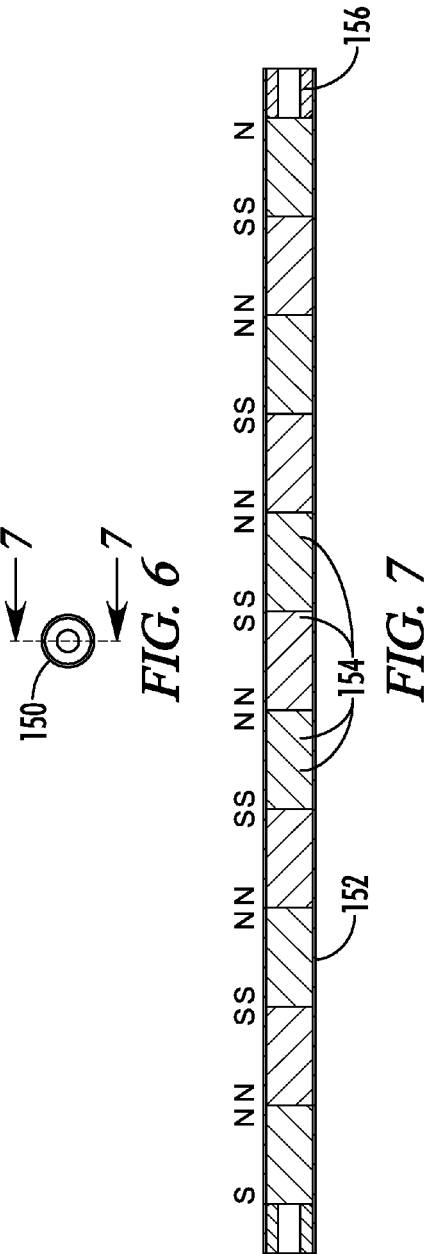

MOTORIZED STAGE

CROSS-REFERENCE TO RELATED APPLICATIONS

This application claims the benefit of U.S. Application 61/252,263, filed Oct. 16, 2009, the contents of which are incorporated herein by reference.

FIELD OF THE INVENTION

The invention generally relates to a motorized stage, and more particularly to a microscopy stage, for example, that is capable of operating a high speeds and with negligible backlash compared to conventional lead screw driven microscopy stages.

BACKGROUND

Motorized microscopy stages are typically controlled by lead screws that are driven by x-axis and y-axis motors that extend well beyond the footprint of the loading stage plates. This can be problematic in tight environments where there is not much space between a microscope and the stage plates, for example, or where it is desired to interact with and manipulate specimen plates relative to the stage. In addition, high speed microscopy stages often experience mechanical backlash from a motorized screw-driven or contact-based drive system, which delays positioning of the specimen relative to the microscope objective.

SUMMARY

A stage comprising, in one embodiment, a base platform, a first translation platform having a first axis of motion, and a second translation platform having a second axis of motion, a first linear drive motor for driving the first translation platform in the first axis of motion, and a second linear drive motor for driving the second translation platform in the second axis of motion, wherein each linear drive motor further comprises a coil assembly enclosing a rod stator, and wherein the coil assembly is fixed and the rod stator is movable within the coil assembly. The linear drive motors enable operation of the stage platforms at high speeds and with negligible backlash compared to conventional lead screw driven microscopy stages.

BRIEF DESCRIPTION OF THE DRAWINGS

FIG. 4 is an elevation of the linear drive of FIG. 3.

FIG. 5 is a cross-section taken through line 5-5 of FIG. 4.

FIG. 6 is an end view of the stator of the linear drive of FIG. 3.

FIG. 7 is a cross-section taken through line 7-7 of FIG. 6.

DETAILED DESCRIPTION OF THE PREFERRED EMBODIMENTS

Figure 1:
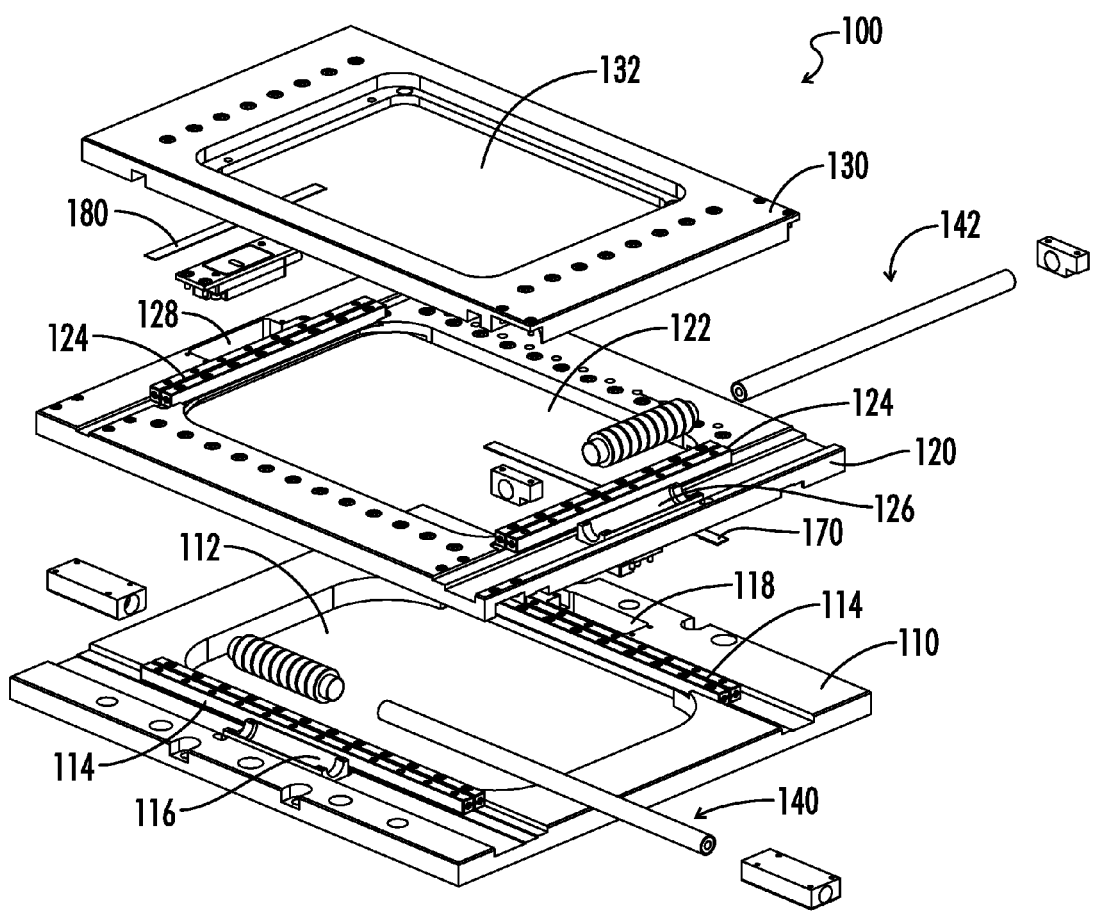
FIG. 1 is an exploded view of a stage in accordance with an embodiment of the invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 is an exploded view of one embodiment of a motorized stage such as, for example, a microscopy oriented XY translation stage 100 that is capable of operating a high speeds and with negligible backlash compared to conventional lead screw driven microscopy stages. The stage 100 described herein can be used with, for example, an autofocus apparatus as described in U.S. Patent Application 61/252,263, filed Oct. 16, 2009, the contents of which are incorporated herein by reference. Other uses of the stage 100 are possible. As will be described below, stage 100 comprises a tightly integrated, highly compact design with minimal thickness and moving parts in the optical axis of a microscope, for example.

Stage 100 further comprises a base plate layer 110, an X translation platform layer 120 and a Y translating platform layer 130 all with central apertures 112, 122, 132 respectively that are designed to accept microscopy oriented loads (not shown). The stage 100 is designed to accept a variety of loads including, but not limited to any style well plate, microscope slide, or general mounting platform, for example. The apertures 112, 122, 132, whether arranged perpendicular or parallel to the mounting surface of the stage 100, are preferably unobstructed by any components of the stage. The embodiment of the X platform 120 is coupled to the base plate 110 via a low-friction cross roller bearing rail pair 114, and the Y platform 130 is coupled to the X platform 120 via another orthogonally orientated low-friction cross roller bearing rail pair 124. While cross roller bearing rails are shown, it will be appreciated that other types of bearings may be used, such as carriage-type (see FIG. 10), linear air bearings and others. Separation gaps between the platforms 120, 130 of the stage 100 are kept to a minimum while still allowing the three layers 110, 120, 130 of this construction to move freely with respect to each other. All motion and position feedback components are preferably integrated tightly within cavities formed between the platforms. In addition to the low friction bearing rails 114, 124 in the embodiment described herein, there are preferably no other physical contact points or coupled interfaces between the three layers 110, 120, 130 of the stage 100, which ensures a high degree of friction free motion with consequent low maintenance and high reliability.

In one embodiment described herein, motion drive forces in both the X and Y directions are generated in a non contact implementation that eliminates the need for lead screws, belts drives, gear boxes or any other form of contact-based drive system. In one embodiment, the non contact drive comprises orthogonally located linear motors 140, 142 that are fully integrated within the structure of the stage 100. Cavities are preferably created between the three layers of the stage 100, one cavity 116 for the X linear motor 140 between the base plate 110 and X translation platform 120 and one cavity 126 for the Y linear motor 142 between the X translation platform 120 and the Y translation platform 130. While the linear motors 140, 142 are illustrated as integrated into the stage construction, the drive/controller system could also be separate from the stage construction if desired.

Figure 2:
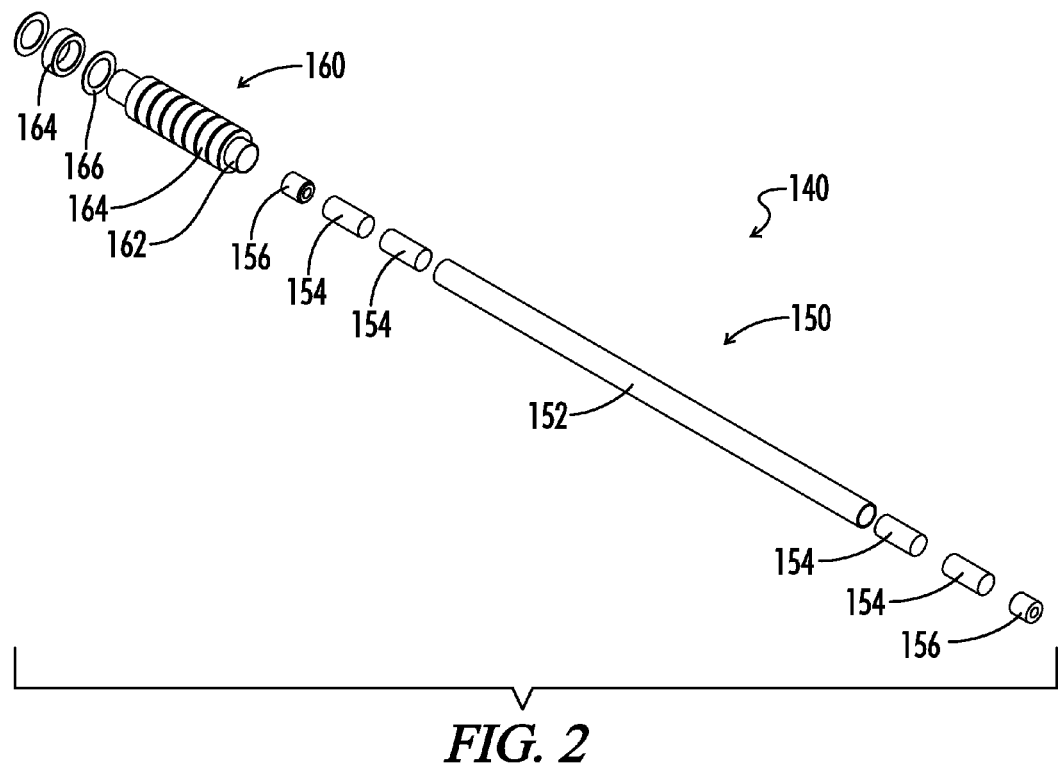
FIG. 2 is an exploded view of a linear drive in accordance with an embodiment of the invention.
Figure 3:
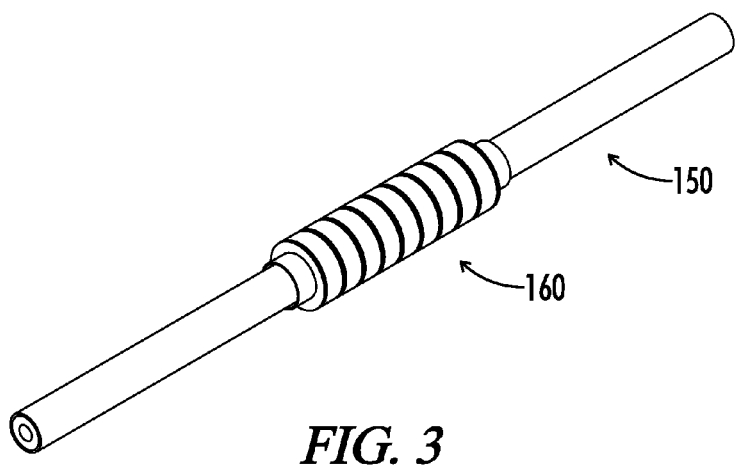
FIG. 3 is an assembled view of the linear drive of FIG. 2.

FIG. 2 is an exploded view of one embodiment of the linear motor 140, 142 of FIG. 1. FIG. 3 is an assembled view, FIG. 4 is an elevation and FIG. 5 is a cross-section taken through line 5-5 of FIG. 4 of the embodiment of the linear motor 140, 142. While linear motors 140, 142 are, for purposes of this discussion preferably identical, for ease of explanation the linear motor of FIGS. 2-5 will be identified as linear motor 140. Linear motor 140 comprises a rod shaped stator 150 and an enclosing electromagnetic coil assembly 160. The stator 150 is assembled preferably using a stainless steel stator tube 152 within which are located a series of cylindrical magnets 154 disposed between end caps 156, the magnets 154 being arranged end face to end face and in such an orientation that the same magnetic poles are adjacent to each other as shown in FIG. 7, which is a cross-section taken through line 7-7 of the end view of the stator 150 of FIG. 6. The coil assembly 160 preferably comprises a stainless steel tube 162 on which a number of coil segments 164 are wound and bonded to the tube. Insulating washers 166 are located between each coil segment 164. The stator tube 152 is dimensioned to allow the coil assembly tube 162 to slide freely over and without making contact. While certain materials are described herein in connection with the construction of certain aspects of the linear motor, it will be appreciated that other materials, alloys, material compositions or combinations of the same are also contemplated.

Figure 8:
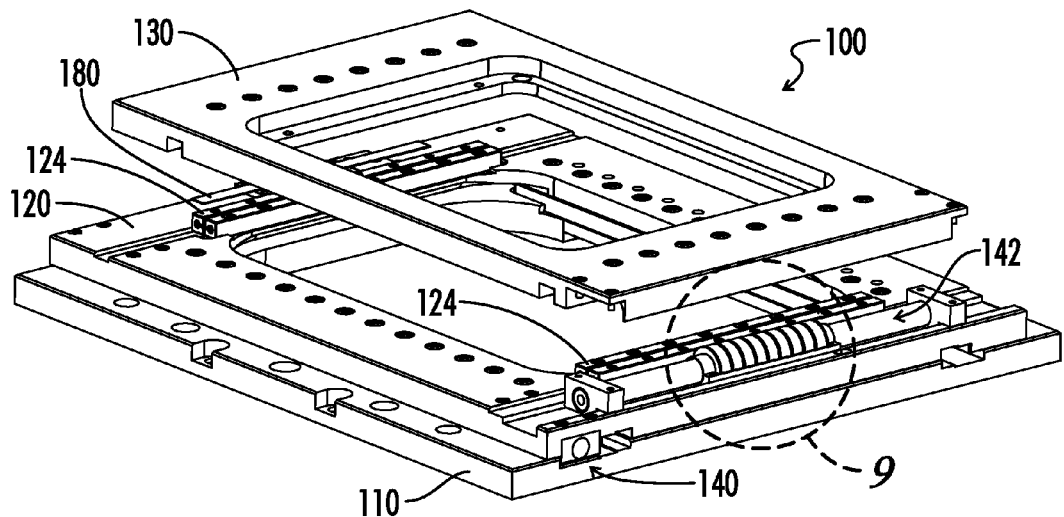
FIG. 8 is a partially exploded view of the stage of FIG. 1.
Figure 9:
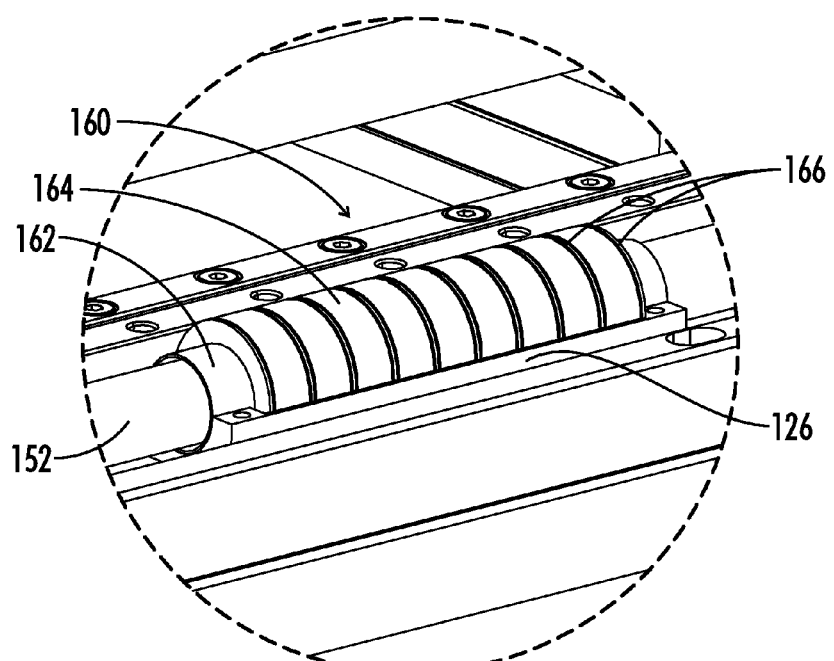
FIG. 9 is a close-up view of the circled area 9 in FIG. 8.

FIG. 8 illustrates a partially exploded view of one embodiment of the stage 100 with the X translation platform 120 assembled onto the base 110 and the Y translation platform 130 positioned above the X translation platform 120 for assembly thereon. FIG. 9 is a close-up view of circled region 9 in FIG. 8. The coil assembly 160 of each linear motor 140, 142 is tightly integrated into the stage assembly by being housed in cavities 116, 126 therein. For the X axis of motion, the coil assembly is held in a cavity 116 (FIG. 1) within the base plate 110. For the Y axis of travel, the coil assembly is held within a cavity 126 within the X translation platform 120. The X axis coil assembly is fixed relative to the motion of the X translation platform 120 and the Y axis coil assembly is fixed relative to the motion of the Y translation platform 130. The X axis stator tube is mounted to the X translation platform 120 in such a way that it passes through the center of the X axis coil assembly tube (FIG. 1). Similarly, the Y axis stator tube is mounted to the Y translation platform 130 in such a way that it passes through the center of the Y axis coil assembly tube. In the embodiments illustrated herein, it is the stator tube and not the coil assembly that is in motion for each axis of travel.

As shown in FIG. 1, position feedback is facilitated using, in one embodiment, linear encoder scales 170, 180 embedded in cavities 118, 128 respectively located within the stage construction. The X axis encoder 170 is located in cavity 118 contained within the base plate 110 and the Y axis encoder 180 is contained within a cavity 128 located within the X translation platform 120. The associated read heads are located in the X translation platform 120 for the X axis and the Y translation platform 130 for the Y Axis. While linear encoder scales are described herein, other positioning means are contemplated. In the stage 100 of the current embodiment, the bearing rails, stator tube and linear encoder scale are preferably oriented to be parallel to each other in each axis of motion.

Figure 10:
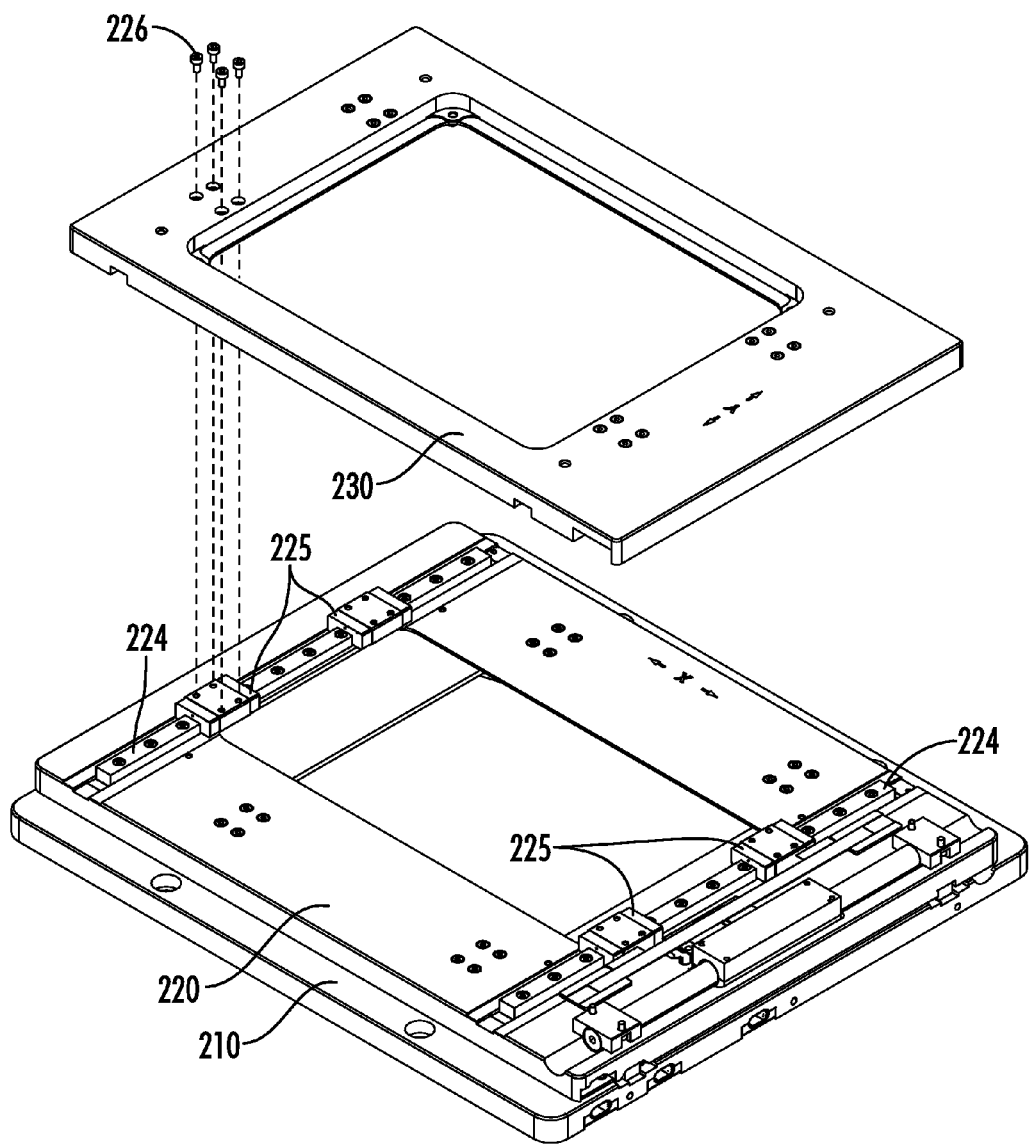
FIG. 10 is a partially exploded view of a stage in accordance with an alternative embodiment of the invention.

FIG. 10 illustrates an alternative embodiment of a stage 200 further comprising a base plate layer 210, an X translation platform layer 220, and a Y translating platform layer 230 that is similar in design to the stage 100 of FIGS. 1-9. In the embodiment of FIG. 10, the Y platform 230 is coupled to the X platform 220 via a low-friction recirculating-type carriage bearing rail pair 224 including carriage bearings 225 that are secured to the Y platform by fasteners 226, for example. While screw fasteners 226 are shown, other fasteners are possible. Similarly, the X platform 220 is coupled to the base plate layer 210 via another orthogonally orientated low-friction recirculating-type carriage bearing rail pair including carriage bearings (not shown). With recirculating type bearings that use a single rail 224, for example, the performance of the stage 200 may be more reliable as such bearings are less likely to open up than the crossed rollers if the stage 200 is distorted through, preloading, pinning to an uneven mounting platform or through thermal expansion, for example. Irrespective of the type of bearings used, separation gaps between the platforms 220, 230 of the stage 200 are kept to a minimum while still allowing the three layers 210, 220, 230 of this construction to move freely with respect to each other.

Thus, there is provided a monolithic two-axis or three-axis stage, each axis being driven by a linear induction motor comprised of a linearly displaceable magnetic rod assembly encapsulated by stationary cylindrical coils. Each axis of movement is dependent on the translation platform and the positioning of the X and Y translation platforms relative to each other and to the base platform, such that aside from the base platform of the stage, each axis is preferably not operable on its own if separated. In addition, while not shown, the concepts disclosed herein could also be expanded to a third axis of movement, such as the Z axis or along an optical axis as in microscopy applications, for example, where a similar translation along a third axis is driven by a similarly arranged linear motor assembly.

The stage 100 or 200, for example, can be used in a variety of industries for a variety of applications. One non-limiting example is for microscopy where the stage is used to either position any part of a microscope with respect to a sample, or a sample with respect to a microscope. With microscopy applications in particular, a major practical advantage is realized by incorporating plates with minimal thickness and a minimum separation therebetween, which results in a lower overall mass and less power required to accelerate the stage. Another non-limiting example includes machine vision inspection, or non contact-based dimensional inspection. Other industries and applications are contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A stage comprising:
   a base plate, a first translation platform having a first axis of motion, and a second translation platform having a second axis of motion;
   a first linear drive motor disposed between the base plate and the first translation platform and oriented in alignment with first axis of motion and seated within a first cavity in the base plate; and
   a second linear drive motor disposed between the first translation platform and the second translation platform and oriented in alignment with the second axis of motion and seated within a second cavity in the first translation platform;
   wherein the first linear drive motor comprises a first coil assembly enclosing a first stator, the first coil assembly being restrained within the first cavity such that the first coil assembly is fixed with respect to the base plate and the first rod stator is movable within the first coil assembly, wherein the first rod stator is mounted to the first translation platform such that the first rod stator drives the first translation platform in the first axis of motion, wherein the second linear drive motor comprises a second coil assembly enclosing a second rod stator, the second coil assembly being restrained within the second cavity such that the second coil assembly is fixed with respect to the first translation platform and the second rod stator is moveable within the second coil assembly, wherein the second rod stator is mounted to the second translation platform such that the second rod stator drives the second translation platform in the second axis of motion, and wherein each of the first and second rod stators further comprises a series of magnets arranged end face to end face such that the same magnetic poles are adjacent each other.

2. The stage of claim 1, wherein the second linear drive motor is oriented orthogonal to the first linear drive motor.

3. The stage of claim 1, further comprising positional feedback of the first and second translation platforms.

4. The stage of claim 3, wherein the positional feedback includes linear encoder scales.

5. The stage of claim 1, further comprising bearing rails disposed between the base plate and the first translation platform, and between the first translation platform and the second translation platform.

6. The stage of claim 5, wherein the bearing rails are low friction and constitute the only contact points between the base plate and the translation platforms.

7. The stage of claim 5, wherein the bearing rails further comprise low-friction recirculating-type carriage bearings.

8. The stage of claim 1, wherein the coil assembly further comprises a tube including a plurality of coil segments wound and bonded to the tube.

9. The stage of claim 8, further comprising insulating washers positioned between each coil segment.

10. A stage comprising:

a first translation platform having a first axis of motion, and a second translation platform having a second axis of motion;

a first linear drive motor for driving the first translation platform in the first axis of motion, and a second linear drive motor for driving the second translation platform in the second axis of motion;

wherein the first linear drive motor comprises a first coil assembly enclosing a first rod stator;

wherein the first coil assembly is fixed with respect to a base plate and the first rod stator is movable within the first coil assembly, wherein the first rod stator is mounted to the first translation platform such that the first rod stator drives the first translation platform in the first axis of motion, wherein the second coil assembly is fixed with respect to the first translation platform and the second rod stator is moveable within the second coil assembly, wherein the second rod stator is mounted to the second translation platform such that the second rod stator drives the second translation platform in the second axis of motion, and wherein each of the first and second rod stators further comprises a series of magnets arranged end face to end face such that the same magnetic poles are adjacent each other.

11. The stage of claim 10, wherein the second linear drive motor is oriented orthogonal to the first linear drive motor.

12. The stage of claim 10, further comprising positional feedback of the first and second translation platforms.

13. The stage of claim 12, wherein the positional feedback includes linear encoder scales.

14. The stage of claim 10, further comprising bearing rails disposed between the base plate and the first translation platform, and between the first translation platform and the second translation platform.

15. The stage of claim 14, wherein the bearing rails are low friction and constitute the only contact points between the base plate and the translation platforms.

16. The stage of claim 14, wherein the bearing rails further comprise low-friction recirculating-type carriage bearings.

17. The stage of claim 10, wherein the coil assembly further comprises a tube including a plurality of coil segments wound and bonded to the tube.

18. The stage of claim 17, further comprising insulating washers positioned between each coil segment.

* * * * *